Dec. 28, 1965 M. ARTZT 3,226,706
CATHODE RAY TUBE DISPLAY AND PRINTER CONTROLLED BY CODED MASK
Filed May 31, 1962 5 Sheets-Sheet 1

INVENTOR.
MAURICE ARTZT
BY Morris B. Rabkin
Attorney

INVENTOR.
MAURICE ARTZT
BY
Morris B. Rabkin
Attorney

Dec. 28, 1965 M. ARTZT 3,226,706

CATHODE RAY TUBE DISPLAY AND PRINTER CONTROLLED BY CODED MASK

Filed May 31, 1962 5 Sheets-Sheet 3

INVENTOR.
MAURICE ARTZT
BY
Morris [illegible]
Attorney

INVENTOR.
MAURICE ARTZT
BY
Morris L. Rabkin
Attorney

INVENTOR.
MAURICE ARTZT
BY
Morris L. Rabkin
Attorney 3,226,706

CATHODE RAY TUBE DISPLAY AND PRINTER CONTROLLED BY CODED MASK

Maurice Artzt, Princeton, N.J., assignor to Radio Corporation of America, a corporation of Delaware Filed May 31, 1962, Ser. No. 199,006
10 Claims. (Cl. 340—324)

This invention relates to information translating apparatus, and particularly to a system for translating character representing codes into character representing electrical signals or into legible characters.

The invention is especially suitable for use in electronic data processing equipment for printing alpha-numeric characters. The invention, however, is also useful for selecting and generating signals representing any symbol and for displaying or printing such symbol, if desired. Thus, the term "character" as used herein includes any symbol whether alpha-numeric or other designation.

In electronic data processing apparatus, such as computers, printers, magnetic tape stations and the like, characters are usually available in the form of a multi-bit digital code. Various electromechanical and electro-optical systems have been developed for high speed print-out from computers and other electronic data processing equipment. Such print-out systems may operate to generate selected signals corresponding to the code for a particular character and to operate printing apparatus under the control of those signals. Electromechanical character signal generators and printers, such as those which use rotating discs from which the character signals may be transduced, usually require extensive electronic or electromagnetic switching. Known electro-optical character signal generators may involve deflection of an electron beam in a cathode ray tube to the position of a character replica on a mask containing many different such replicas and which is disposed near the face of the tube. Unless the electron beam is precisely positioned with respect to the selected replica in such known electro-optical character generators, the characters which are displayed or printed may not be of uniform shape.

It is an object of the present invention to provide improved apparatus for translating coded information into legible form, which apparatus eliminates or reduces the disadvantages of known electromechanical and electro-optical systems intended to serve the same purpose.

It is a further object of the present invention to provide an improved character selector and character signal generator capable of extremely high speed operation and which can operate more reliably and precisely than known apparatus of this purpose.

It is a still further object of the present invention to provide an improved character signal generator and/or printer apparatus which is of relatively low cost as compared to high speed print-out devices presently available.

It is a still further object of the present invention to provide apparatus for translating characters represented by a digital code into legible form which apparatus is asynchonous in operation in that synchronization with input information is not needed.

It is a still further object of the present invention to provide an improved electro-optical character signal selector and generator useful for operating a display device or a printer.

The foregoing and other objects of the present invention may be attained by means of apparatus embodying the invention which includes a cathode ray tube and a mask having a plurality of tracks each representing a different character disposed near the screen of the tube so that light emitted from the screen will be incident on the mask. In order to select a character, means are operative for converting coded information for the selected character into a beam deflection voltage to deflect the beam to a position on the cathode ray tube screen where light from the screen is incident on the mask at the beginning of the track for the selected character. Means are provided for deflecting the beam in a direction to scan the track. Photoelectric means are provided for translating light transmitted through the track as it is scanned into an electrical signal representing the selected character. Means, such as another cathode ray tube or a facsimile printer, may operate in response to the signal to display or print the selected character. Apparatus according to the foregoing can operate at extremely high speeds in excess of ten thousand characters per second, since the electron beam can be deflected rapidly and accurately to select a desired character track and then along that character track so as to electro-optically generate a character signal.

The invention itself, both as to its organization and method of operation, as well as additional objects and advantages thereof, will become more readily apparent from a reading of the following description in connection with the accompanying drawings, in which.

Figure 1:
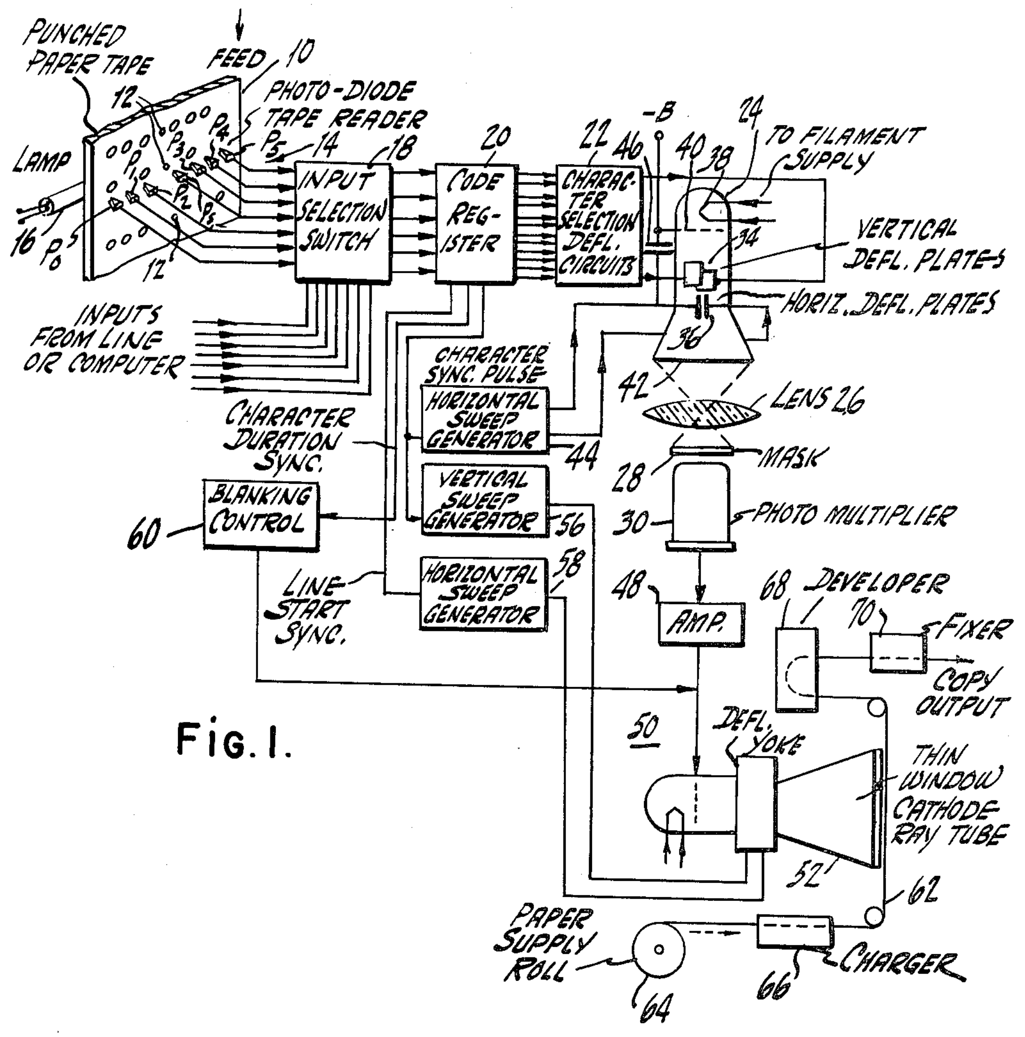
FIG. 1 is a block diagram, partially diagrammatic, which shows a system for selecting and generating signals in response to coded information and for printing characters in response to the generated signals.
Figure 2:
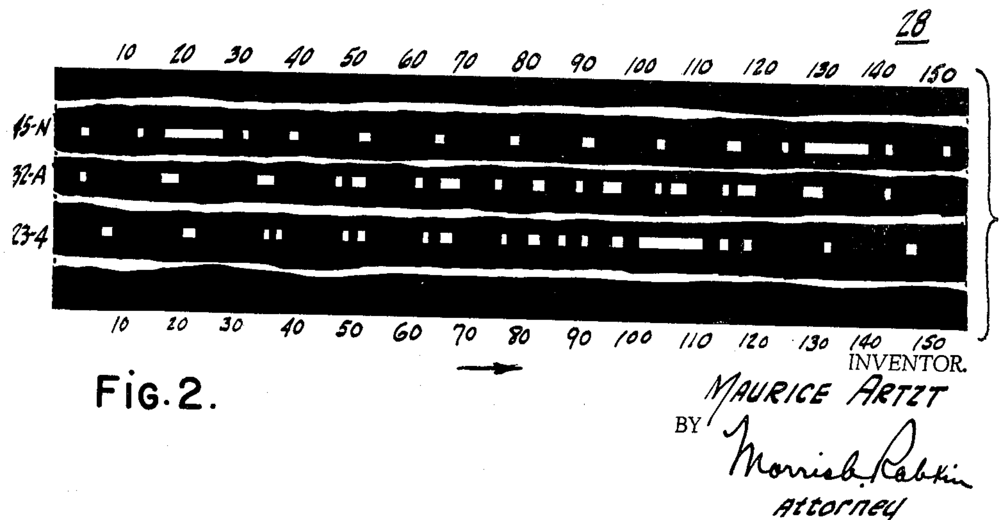
FIG. 2 is a plan view, partly broken away of a mask used in the system of FIG. 1.
Figures 3A, 3B, 5:
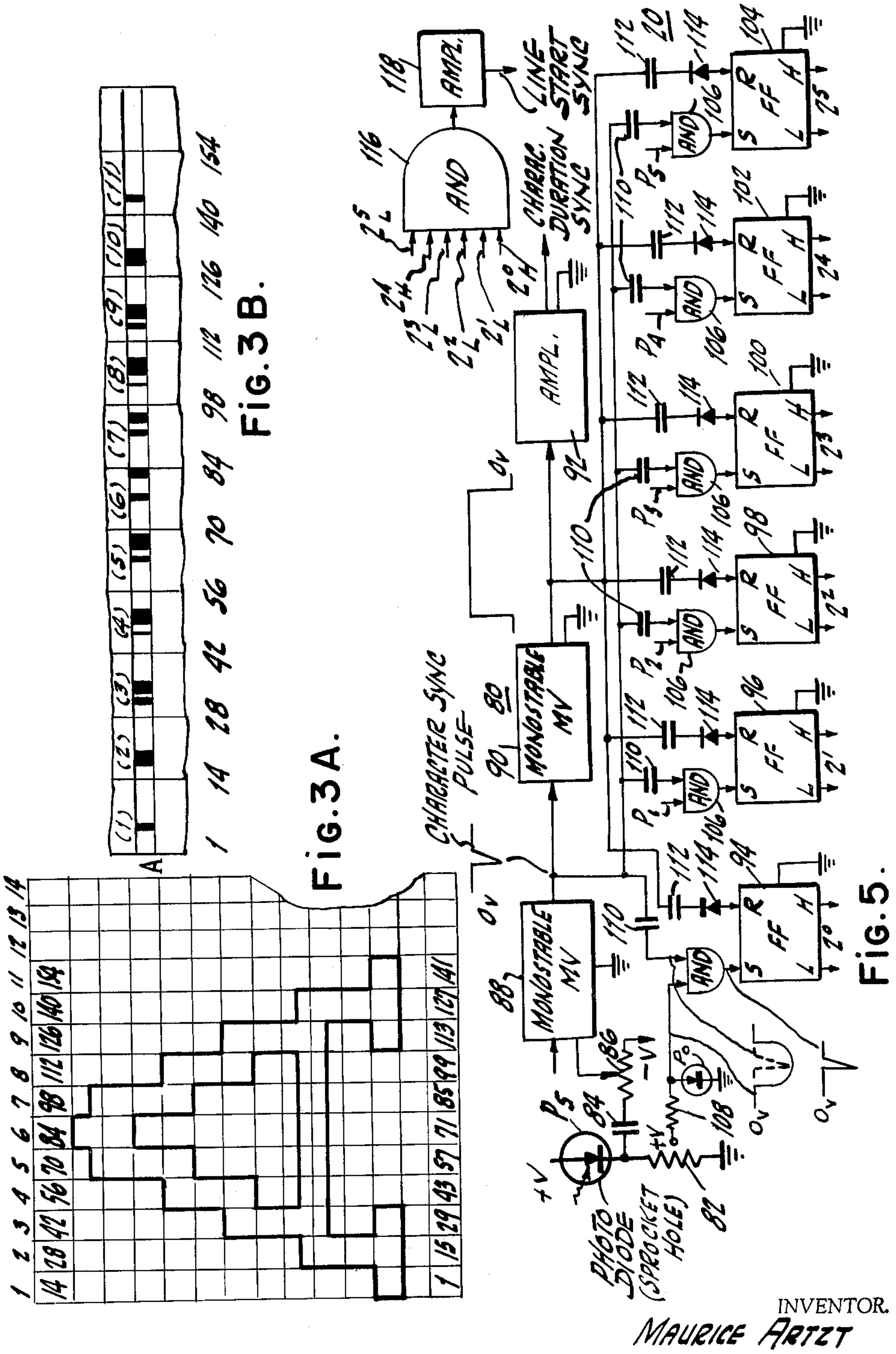
Figure 4:
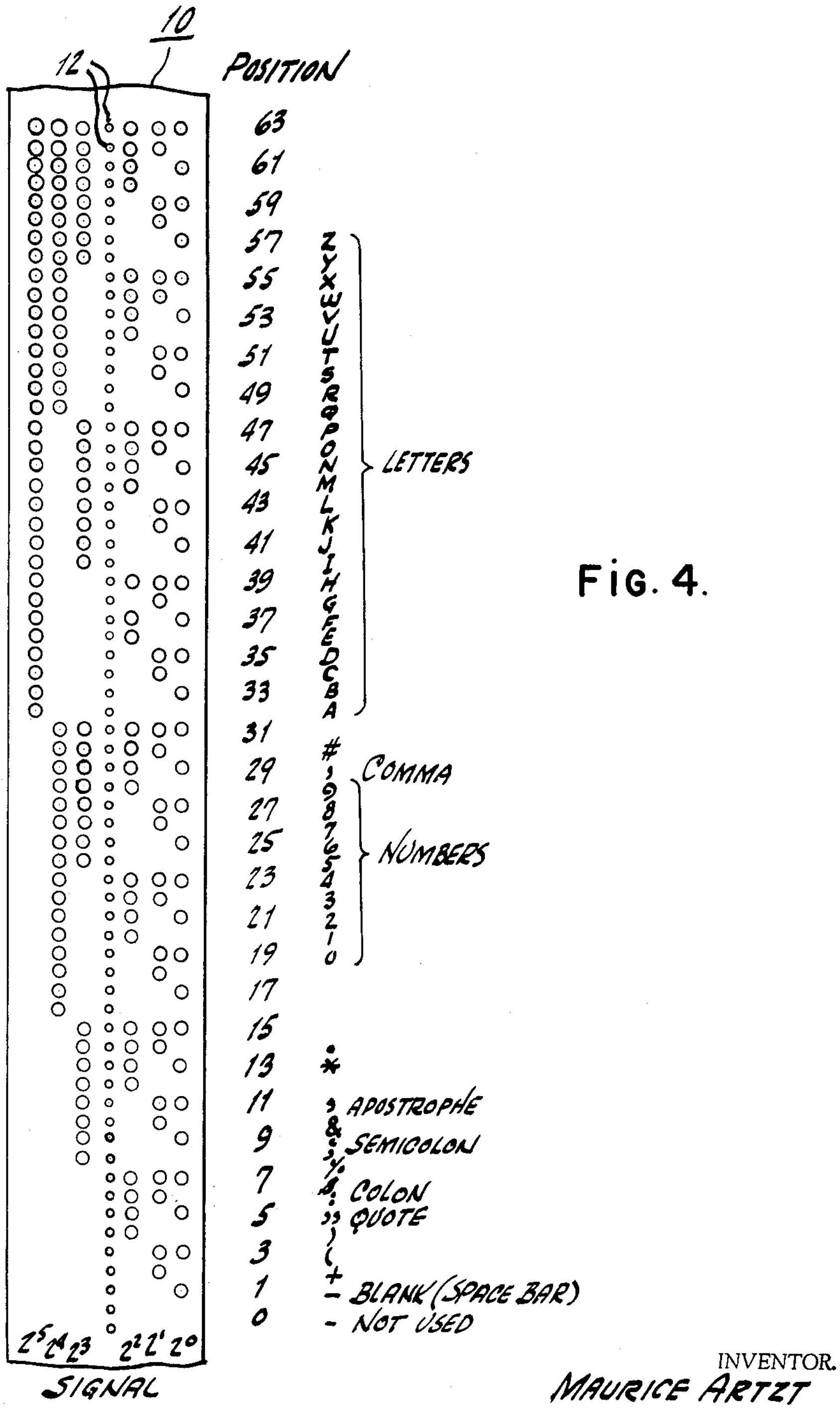
Figure 6:
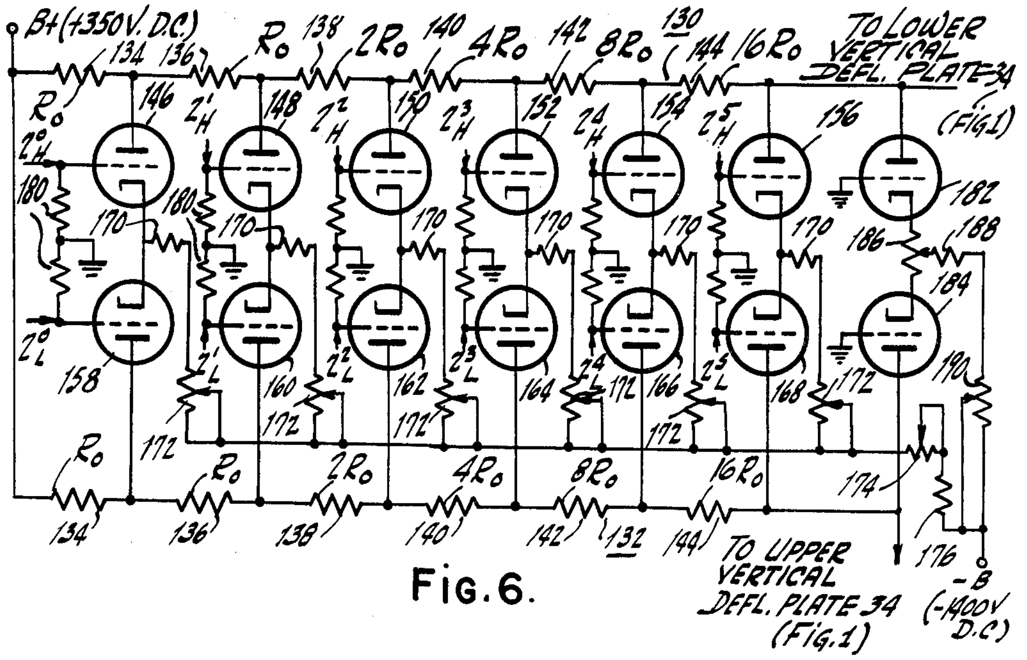
Figure 7:
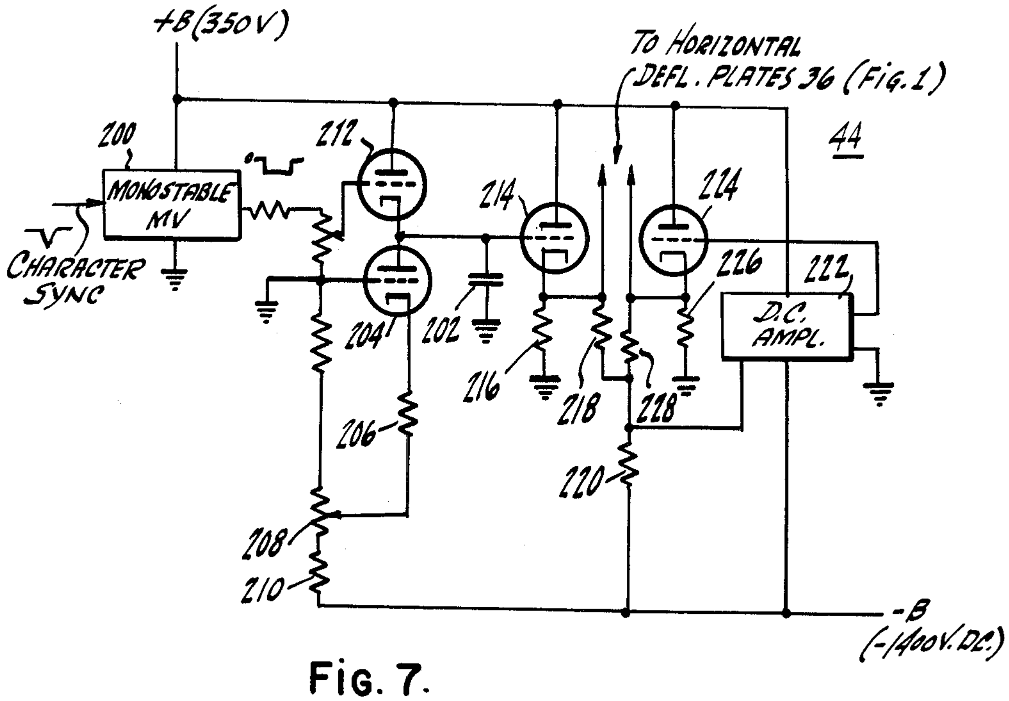
Figure 8:
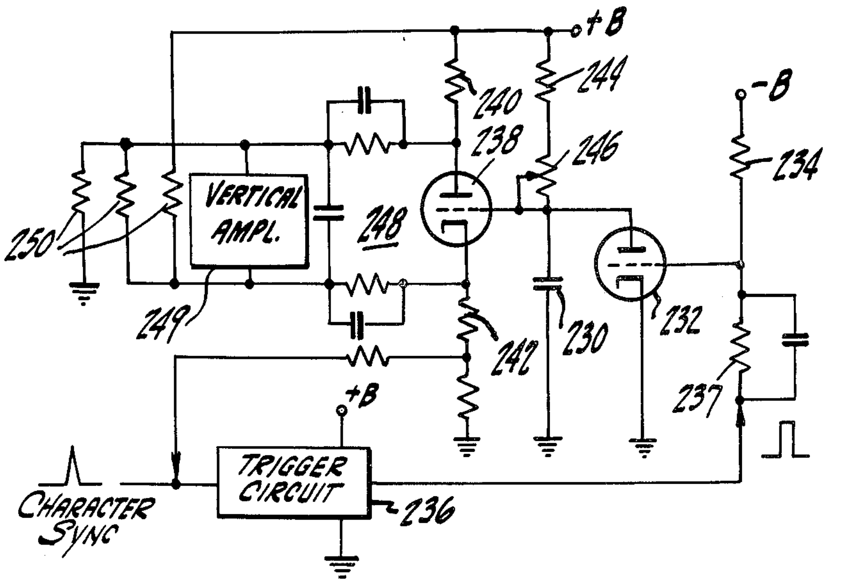

FIG. 3*a* is an illustrative diagram of the type which is used in preparing character tracks on the mask of FIG. 2, the letter "A" being depicted by way of example;

FIG. 3*b* is a schematic diagram showing a step in the method of forming a character track on the mask of FIG. 2 from the diagram of FIG. 3*a*;

FIG. 4 is a fragmentary, plan view of a punched tape such as may be used in the system of FIG. 1 and showing the codes for a plurality of characters;

FIG. 5 is a schematic diagram, partially in block form, of the code register which is used in the system of FIG. 1;

FIG. 6 is a schematic diagram of the character selection-deflection circuits used in the system of FIG. 1;

FIG. 7 is a schematic diagram, partially in block form, of the horizontal sweep generator used in the system of FIG. 1; and FIG. 8 is a schematic diagram, partially in block form, of the vertical sweep generator used in the system of FIG. 1.

*The system in general*

Referring more specifically to FIG. 1, there is shown a punched paper tape 10 having a series of sprocket holes 12 longitudinally therealong. The tape may be punched with various combinations of six holes, three on each side of a sprocket hole 12, along successive rows substantially perpendicular to the edge of the tape. The sprocket holes 12 are desirably smaller than the punched holes as explained hereinafter. The tape may be driven by a drive mechanism including a sprocket of the type used in paper tape readers known in the art.

The tape is read by a tape reader 14 including a lamp 16 which illuminates only one of the transverse rows of holes at a time as that row passes the lamp. The tape reader 14 includes seven photo-diodes $P_0$, $P_1$, $P_2$, $P_s$, $P_3$, $P_4$ and $P_5$. The center photo-diode $P_s$ is responsive to light passing through the sprocket holes 12. The photo-diodes respond to light passing through the holes in the tape to provide an output pulse.

The photo-diodes are connected to an input selection switch 18. Also connected to this switch 18 are inputs from a digital data transmission line from a computer or other data processing apparatus. The switch 18 may include relay, transistor or diode switching for selecting inputs from the paper tape reader 14 or from data handling equipment. The herein described system can be used either as an on line or an off line printer in a data processing system by appropriate use of the switch 18.

A code register 20 receives inputs from the switch 18 and has the capacity to store code information representing the various characters which information may originate from the punched paper tape 10 or from the other data processing apparatus. The characters are stored in the code register for a predetermined time during which a character signal is generated. The predetermined character storage time may be shorter or longer than the time between succeeding character code inputs to the system. In most instances, as when the character code inputs are provided by a punched tape, the character generation time is shorter than the time between arrival of succeeding character codes. The high speed of operation of the system, among other things, permits asynchronous system operation; that is, the time of arrival of the characters at the input of the system need not be synchronized with system operation, such as the formation of legible characters of character signals at the output thereof.

The code register 20 also includes circuits for generating pulses for internal synchronization of the operation of the system. These pulses are a character synchronizing (sync) pulse, a character duration sync pulse, and a line start sync pulse. The character sync pulse initiates the read out of a coded character into the register 20 from the tape 10. The character duration sync pulse starts with the character sync pulse and has a duration equal to the duration of a character signal. The length of the character duration sync pulse may include the time between successive character signals or the space between successive written characters. The line start sync pulse is provided by the code register in response to the storage therein of a code for representing the beginning of a line of characters or words. The code register 20 and its operation are described hereinafter in greater detail in connection with FIG. 5.

Character selection-deflection circuits 22 operate in response to the coded information stored in the register 20 and convert this information into vertical deflection voltages of different magnitudes for different character codes. The magnitudes of these deflection voltages depend upon the particular character represented by the code read from the tape 10 by the reader 14 and stored in the register 20. A detailed description of circuitry and operation of the character selection-deflection circuits follows hereinafter in connection with the detailed description of FIG. 6.

The electro-optical portion of the character selection and generating system includes a cathode ray tube 24, a lens system represented by a lens 26, a slide or mask 28 and a photomultiplier tube 30. The cathode ray tube 24 has vertical deflection plates 34 and horizontal deflection plates 36 which can electrostatically deflect an electron beam generated by an electron gun including a filament or heater 38 and a control electrode 40. The screen 42 of the tube 24 is preferably internally coated with a high speed phosphor such as a P15 phosphor. The tube 24, for example, may be a type 3W P15 tube. The light from the screen is focused by the lens system 26 on the mask 28. This mask may be made photographically with a large number of tracks or strips having different patterns of transparent and opaque areas. The tracks are spaced from each other and run in the same direction. In the herein described system, the tracks are disposed along one of two rectangular coordinates (more particularly, along the "X" or horizontal coordinates). In other words, the mask has a large number of horizontal tracks displaced from each other along the "Y" or vertical coordinate. The construction of the slide and its configuration are described hereinafter in connection with FIGS. 3*a*, 3*b* and 4.

A horizontal sweep generator 44, synchronized by the character sync pulse, applies a sawtooth deflection voltage across the horizontal deflection plates 36 which causes the electron beam to sweep horizontally across the screen 42 of the tube 24 and emit a spot of light which traces or scans a selected character track. The cathode ray tube 24 is normally blanked by a biasing voltage applied to its control electrode 40 from a source of operating voltage which may be applied to a terminal indicated by the legend —B.

The beam is vertically deflected to a predetermined position by the voltage applied to the vertical deflection plates 34 from the character selection-deflection circuits 22 so that, when the beam strikes the phosphor on the screen 42, a spot of light is emitted from the screen which is focused by the lens system 26 at the beginning of the track for the selected character on the mask 28. When the horizontal sweep generator 44 is triggered by the character sync pulse, a signal is transmitted through a coupling capacitor 46 to the control electrode 40 to overcome the bias thereon and unblank the beam. The beam will then be swept horizontally across the screen by the deflection voltages from the sweep generator 44 applied across the deflection plates 36. The duration of the horizontal sweep is related to the duration of each of the vertical sweeps used to reconstruct successive segments of the character, since different successive parts of the tracks on the mask 28 correspond to the different successive segments of the character, as will be explained more fully hereinafter. The spot of light from the screen 42 traces the selected track on the mask 28. At the end of the sweep period, the beam is again blanked by the biasing voltage applied to the control electrode 40. The next character may then be selected.

The photomultiplier 30 may be of a type which has a photosensitive surface responsive to the light emitted by the phosphor on the screen 42. A type 931A photomultiplier tube is suitable for use with the 3W P15 cathode ray tube 24. The photomultiplier tube 30 provides the character signal corresponding to the character represented by that track on the mask 28 which is traced by light emitted from the screen 42. These character signals are amplified in an amplifier 48. The character signals for different characters are provided successively, or in serial order, at the output of the amplifier 48. Words may be formed character by character in response to the serial character signals from the amplifier 48.

The character signals may be used to operate a facsimile type printer, such as a high speed printer 50 using electrophotographic printing paper. The printer 50 utilizes a thin-window cathode ray tube 52, such as described in a paper by R. G. Olden entitled "High Speed Printing On Electrofax" (RCA Review, September 1961, vol. XXII, No. 3, Pages 582–589). The character signals are applied to a control electrode 54 of the tube 52 and are used to modulate the electron beam generated by the electron gun in the tube 52. The beam is deflected by sweep currents applied by a vertical sweep generator 56 and a horizontal sweep generator 58. The sweep generators 56, 58 scan a raster having a plurality of vertical scanning lines across the screen of the thin-window cathode ray tube 52. Each of these lines corresponds to and traces another successive segment of a character. The horizontal sweep of the beam in the tube 24 traces successive parts of the characters as it traces across each track. Thus, the horizontal sweep rate and duration are such that the tracing of each line on the screen of the tube 52 is synchronous with the tracing of a character segment corresponding to that line during the horizontal sweep of the beam in the generator tube 24.

The vertical sweep generator is synchronized by the character sync pulse so that the beginning of a vertical line of the raster occurs substantially simultaneously with the beginning of the horizontal sweep of the beam in the cathode ray tube 24 of the character signal generator.

system is, therefore, essentially reliable and fail safe, and erroneous character signals are not usually generated. Another feature of the system in using the mask 28 is that the beam can be on in command signal positions, such as may be represented by a line start or carriage return code, but positioned to illuminate opaque parts of the mask, so that no outputs are provided by the photomultiplier 30 (FIG. 1). The system therefore is not complicated by circuits which gate out or otherwise control the application of command signals. Command signals may, however, be photoelectrically derived by individual photoelectric devices, such as photo diodes which are placed in appropriate positions near the screen 42 of the cathode ray tube 24. The photo diodes will therefore provide command signals in response to illumination of their corresponding positions on the screen 42. Such illumination is blanked by the slide 28 and does not affect the generation of the character signals by the photomultiplier 30.

*Character codes*

The codes which may be used to provide character inputs to the system of FIG. 1 are illustrated in FIG. 4. The punched paper tape 10 is shown punched with holes in each row corresponding to the codes for the various characters. A six unit or six bit digital code is used. It will be appreciated that such a six bit code may also be derived from other data processing apparatus such as a computer, magnetic tape station or the like. The holes are arranged in columns indicated in FIG. 4 from right to left as the $2^0$, $2^1$, $2^2$, $2^3$, $2^4$ and $2^5$ column. That is, the bits representing the lower order binary values are on the right and the bits representing the higher values are on the left as viewed in FIG. 4. The sprocket holes 12, which are smaller than the punched holes representing the bits, are shown centrally located on the tape 10. These holes are used to generate timing signals, as will be explained hereinafter in connection with FIG. 5.

The characters represented by the six bit code punched on the tape 10 and their corresponding decimal value are shown at the right of the tape 10 in FIG. 4. These decimal values correspond to the relative amplitudes of the vertical deflection voltages which are used to select code tracks on the mask 28 representing the various characters by means of the cathode ray tube 24. Although all possible combinations of holes are shown, several are not used to represent characters in this illustrative embodiment. The vertical positions on the mask corresponding to these codes are opaque as explained above so that no outputs result. These unused codes may provide command signals for other data processing operations. Characters having different shapes or fonts may readily be provided by a different mask 28 for each font. The shape of the letters displayed or printed can be varied readily by interchanging slides. Alternatively, a plurality of fonts of character shapes or even different characters may be generated by making a plurality of masked areas, each having character tracks for its own characters, on the same slide. By adding another bit to the character codes to designate the appropriate masked area for a selected character, deflection voltages which index the beam to a desired mask and a desired character thereon may be applied to the cathode ray tube 24 (FIG. 1) to select any track.

*The code register*

The code register 20 and associated circuits are shown in FIG. 5. Timing circuits 80 of the register are responsive to signals transduced by the photo diode $P_s$ which responds to light transmitted through the sprocket holes 12. The photo diode $P_s$ is connected in series with a resistor 82 between a source of operating voltage +V and ground. When light passes through a sprocket hole 12, the photo diode conducts and a positive voltage pulse appears across the resistor 82 and is transmitted through a capacitor 84 and part of a potentiometer 86 to a trigger circuit such as a monostable multivibrator 88. Negative bias from a source of operating voltage −V is normally applied to the trigger input of the monostable multivibrator 88 through the potentiometer 86. This bias prevents the multivibrator from being triggered except when the photo diode $P_s$ provides a trigger pulse. The monostable multivibrator 88 is designed in accordance with techniques known in the art to provide a sharp negative going output pulse approximately coincident with the pulse from the photo diode $P_s$. This output pulse is used as the character sync pulse for synchronizing the horizontal sweep generator 44 and the vertical sweep generator 56 (FIG. 1).

The character sync pulse from the monostable multivibrator 88 triggers another, similar monstable multivibrator 90, which generates a much longer pulse than does the multivibrator 88. For example, the multivibrator 90 may have a longer time constant recycling circuit than the first multivibrator 88. The time constant is adjusted so that the output pulse from the multivibrator 90 is of a duration approximately equal to the time required for writing a character on the screen of the thin-window cathode ray tube 52. Since a character is written by means of eleven vertical scanning lines in the example illustrated in FIGS. 3*a* and 3*b*, the duration of the output pulse from the monostable multivibrator 90 is approximately equal to the duration of eleven vertical scanning lines, or eleven cycles of the sawtooth waves from the vertical sweep generator 56 which provide vertical deflection in the thin-window cathode ray tube 52.

The output pulses from the monostable multivibrator 90 are amplified in an amplifier 92 and are used as the character duration sync pulses for unblanking the thin-window cathode ray tube 52 of FIG. 1 while a character is being written. The trailing edge of each pulse from the monostable multivibrator 90 of FIG. 5 is used to reset the register 20 after a character is written.

The register 20 provides storage for the bits of a character in six flip-flops 94, 96, 98, 100, 102 and 104 which respectively store the $2_0$, $2_1$, $2_2$, $2_3$, $2_4$ and $2_5$ bits. The flip-flops are bistable circuits of the type known in the art. Each flip-flop has a set input S, a reset input R and two outputs L and H which are respectively negative and positive with respect to ground when the flip-flop is set. When the flip-flop is reset, these outputs L and H are respecitvely positive and negative with respect to ground. The flip-flops may be set or reset by application of a negative voltage pulse respectively to their set or reset inputs.

It is desirable that any of the flip-flops 94, 96, 98, 100, 102 and 104 be set simultaneously in response to light transmitted through corresponding holes which are in the same row on the tape 10, despite slight misalignment of the holes. For this purpose, AND gates 106 are used which provide a negative pulse output when negative pulses are applied coincidentally to the inputs thereof. These AND gates may be diode gates of the type known in the art. A bit input from the photo diodes in the tape reader 14 provides one input to these AND gates 106. The other input is provided by the character sync pulse. The inputs to the AND gate 105 which provide the set input to the flip-flop 94 are shown in detail as being illustrative. The other photo diode input circuits are similar.

When light is incident upon the photo diode $P_0$, current flows therethrough and through a resistor 108 which is in series therewith from a source of operating voltage +V. A negative voltage pulse therefore appears at one of the inputs to the AND gate 106 which is connected to the photo diode $P_0$. This pulse is indicated to the left of the set input of the flip-flop 94. Since the sprocket hole in any row is smaller than the holes in its row which correspond to the bits of the same character, the pulse provided by the photo diode $P_0$ is longer than the pulse resulting from the sprocket hole. The pulse generated The character tracks on the mask are patterned so that successive parts of the character signals correspond to successive vertical lines, slices or segments of the character represented by the tracks. As the beam in the thin-window tube 52 scans successive vertical lines of the raster, parts of these lines are modulated in intensity by the corresponding segments of the character signal. Thus, the character represented by the character signal is traced and displayed on the screen of the thin-window tube. Successive characters are displayed, as successive character signals are applied to the control grid of the thin-window tube 52, so that a line of characters representing words or numbers or the like may be written on the face of the thin-window tube. The line control of the printing is provided by the line start synchronizing signal which initiates the horizontal sweep at the beginning of a line in accordance with the coded information on the tape 10 or from the computer. The beam in the cathode ray tube is turned off, except when a character is being formed, by a blanking control circuit 60. The blanking control may be a source of blanking bias which is gated off by the character duration sync pulse.

A sheet of electrophotographic paper 62 from a paper supply roll 64 is fed past the face of the thin-window tube on which characters are formed. This paper first passes to a charger 66 which sensitizes it. An image of the characters, words and other symbols formed on the screen of the thin-window tube is transferred electrophotographically to the paper 62. This image is developed in a developer 68 and fixed in a fixer 70. The output of the fixer is the printed copy which is obtainable at the output of the fixer. The nature of the electrophotographic process and the operation of the charger 66, developer 68 and fixer 70 is explained in the above-referenced article by R. G. Olden and in other articles referenced therein.

*The mask*

Referring to FIG. 2, there is shown a fragmentary view of the mask 28 which may be a rectangular glass slide such as used in some slide projectors. In an exemplary case, a standard 2" by 2" slide may be used. The mask 28 comprises a one inch square masked area located in the center of the slide. A plurality of character tracks are located at different ones of a plurality of vertically spaced positions in the masked area. Tracks may be provided for various characters such as the letters "A" to "Z", numerals, punctuation marks, etc. Only those tracks for the characters "4", "A" and "N" are shown in FIG. 2 in order to simplify the illustration. The slide is calibrated in rectangular coordinates. By way of specific example, there may be sixty-three (63) vertical positions along the ordinate or vertical coordinate of the slide and one hundred and fifty-four (154) positions along the abscissa or horizontal coordinate of the slide.

The tracks for the characters "4", "A" and "N" are located, respectively, at vertical positions –23–, –32– and –45–. These locations correspond to the decimal value of a binary, digital code for these characters. Selection of any character track depends upon the deflection of the beam in the cathode ray tube 24 over a vertical distance related to the decimal values of the character codes, as will be explained more fully hereinafter.

Each of the horizontal positions corresponds to a separate picture element of a character which may be formed by means of the tracks on the mask 28. Thus, in this exemplary case, there may be one hundred and fifty-four picture elements from which each character may be formed. Consecutive groups of picture elements, fourteen in the illustrated case, correspond to segments of each character. Tthe segments are vertical slices of the characters in the illustrated case, although slices in other directions, say horizontal, may be used.

Each track has a different pattern including different picture elements through which light emitted from the screen 42 of the cathode ray tube 24 may be transmitted to the photomultiplier tube 30. These areas are shown transparent in FIG. 2. In practice, the tracks may be a few hundredths of an inch wide and spaced a few thousandths of an inch from their adjacent tracks.

The light from the cathode ray tube screen 42 is suitably focused by the lens system 26 into a spot narrower than the width of the tracks. Since the spot of light may be positioned anywhere across the width of a selected track, some tolerances can be allowed in the character selection and deflection circuits 22 (FIG. 1).

The formation of the track for the letter "A" is illustrated in FIGS. 3*a* and 3*b*. Similar techniques may be used to provide the character tracks for the other characters to be displayed or printed by means of the system of FIG. 1. As was pointed out in connection with FIG. 2, and as shown in FIG. 3, each character is constituted of a plurality of picture elements, one hundred and fifty-four elements per character being selected for purposes of illustration. These elements are arranged in columns and rows in Cartesian coordinates, vertically and horizontally. The groups of elements in the vertical columns correspond to vertical scanning lines which are traced by the beam in the thin-window cathode ray tube 52 (FIG. 1) or any vertical scanning means, such as may be of the facsimile type, which is used to reconstruct display and/or print the characters in response to the character signals. There are fourteen columns each including fourteen picture elements for each character. The last three of these vertical columns (12), (13) and (14) allow for spacing between successive letters of a word and for horizontal fly-back of the beam in the cathode ray tube 24. eleven columns of fourteen picture elements each or one hundred and fifty-four picture elements are provided for the character itself. The uppermost and lowermost horizontal rows of picture elements are not used to convey picture information so as to allow for the decay of transients in the vertical sweep generator 58 (FIG. 1).

The letter or other character is laid out, using drafting techniques, on a sheet ruled in Cartesian coordinates, as shown in FIG. 3*a*. Different picture elements in each column are occupied either entirely or in part by the letter or the character. The cross line of the "A," for example, cover half of some picture elements in one row and half of some of the picture elements in the row adjacent thereto. The letters are formed by wholly or partially using all or part of those picture elements which enclose an area substantially similar in shape to the shape of the letter involved. In letters such as "A," slanting sides are defined by a staircase of picture elements. Curves are simulated by staircases of various inclinations.

The character is rearranged effectively into a one dimensional form to provide a character track therefor, as shown in FIG. 3*b*. The columns of picture elements are disposed linearly in a horizontal direction. In the case of the track for the letter "A," the first column, including the picture elements 1–14, inclusive, includes a dark area in the location of picture elements –3–. Where two or more spaced picture elements are occupied by the letter, as in column (3), all the occupied picture areas are darkened. These are picture element –31–, and from the second half of picture element –33– up to and including picture element –36–. Consecutive picture elements appear as a longer dark part of the track. The occupied picture elements can be darkened, as by means of India ink. Tracks for all desired character are laid out in enlarged form on paper to provide an enlarged portrayal of the mask 28. This enlarged layout is photographed and photographically printed in reduced size as a negative image on a blank slide. Since a negative of the layout is used, the mask is opaque in each code track except for the occupied picture elements of the tracks. Since the beam in the cathode ray tube 24 is normally in an opaque area of the mask 28, the failure of the cathode ray tube or of the photomultiplier 30 results in no output. The by the multivibrator 88 in response to light incident upon the sprocket hole photo diode $P_s$ is passed through a capacitor 110 to the other input of the AND gate 106 which receives an input from the photo diode $P_0$. The pulse due to the sprocket hole photo diode $P_s$ is shorter than the pulse due to the photo diode $P_0$ and occurs while the photo diode $P_0$ is conducting. The time relationships of the pulses initiated by the operation of these photo diodes $P_0$ and $P_s$ are respectively shown by the full line and dash line curves next to the flip-flop 94 in FIG. 5. The concerned AND gate 106 provides an output pulse, also shown near the flip-flop 94 in FIG. 5, when the pulses initiated by the photo diodes $P_0$ and $P_s$ are coincident. Since the character sync pulses are transmitted through capacitors 110 to the various AND gates 106 simultaneously, the AND gates 106 provide outputs simultaneously. Thus, the flip-flops are set simultaneously in spite of slight misalignment between the punched holes of any rows. The bits of the same character are then stored simultaneously in the flip-flops 94, 96, 98, 100, 102 and 104.

The flip-flops are simultaneously reset by the trailing edge of the character duration sync pulse. This pulse is transmitted to each of the reset inputs of the flip-flops through capacitors 112 and diodes 114 which are polarized to pass only negative voltage pulses. These capacitors 112 and resistance of the circuits connected thereto essentially differentiate the character duration sync pulses and provide a positive and negative pulse corresponding respectively to the leading and lagging edges. The negative, lagging edge pulses are transmitted through the diodes 114 and reset each of the flip-flops.

While the register 20 is shown having only one stage of flip-flops for storage of one character, a plurality of similar storage stages may be used and interconnected as shift registers. The characters may be shifted to succeeding stages of these shift registers by means of a shift pulse derived from the lagging edge of the character duration sync. These shift registers may provide buffer storage for a plurality of characters and allow the system to operate asynchronously should characters arrive at a greater rate than they can be printed.

The line start sync pulse is obtained when the tape reader 14 (FIG. 1) senses a line start code combination. This combination is shown in FIG. 4 at position –17– as a bit in the $2^0$ column and another bit in the $2^4$ column. When the latter bits are transduced by the photo diodes $P_0$ and $P_4$, the flip-flops 94 and 102 will be set. The other flip-flops 96, 98, 100 and 104 remain in reset condition. The outputs of those flip-flops 94, 96, 98, 100, 102 and 104 which are positive when the line start code is sensed are connected to an AND gate 116. The output of the AND gate 116 is a positive level which is amplified and differentiated in an amplifier 118 to provide the line start sync pulse which triggers the horizontal sweep generator 58 for the thin-window cathode ray tube 52.

*The character selection-deflection circuits*

The outputs of the flip-flops in the code register 20 are used in deflection circuits 22 shown in FIG. 6 for developing vertical deflection potentials which enable the beam in the cathode ray tube 24 to be deflected to a position corresponding to the selected character track. The deflection voltage of the vertical deflection plates 34 are obtained across two bleeders 130 and 132 which are connected in electrically balanced relationship with respect to the reference potential point shown illustratively as ground. The bleeders 130 and 132 are each made up of six sections 134, 136, 138, 140, 142 and 144. The value of resistance of each of those sections from the ends of the respective bleeders that are connected to the source of operating voltage B+ to the other ends of the respective bleeders that are connected to the deflection plates increases exponentially as powers to the base two. The resistance of the first resistor section 134 of each of the bleeders 130 and 132 is proportional to one unit of vertical deflection. For convenience, this value of resistance will be called $R_0$. The next resistor section 136 is of the same value as the first. The succeeding resistor sections 138, 140, 142 and 144 increase in value exponentially as powers to the base two, for example 2R*o*, 4R*o*, 8R*o*, and 16R*o*. The bleeders are tapped at the junctions of their resistance sections. These taps are connected to the plates of switching tubes 146, 148, 150, 152, 154 and 156 in the case of the bleeder 130 and to the plates of switching tubes 158, 160, 162, 164, 166 and 168 in the case of the bleeder 132. The cathodes of these switching tubes are connected through different resistors 170 and potentiometers 172, another potentiometer 174 and a resistor 176 to a source of negative operating voltage —B of —1400 volts D.C., for example. The sources of operating voltage are returned to ground so that the anode-cathode path of each of the pairs of switching tubes 146–158, 148–160, 150–162, 152–164, 154–166, and 156–168, which are connected to corresponding taps of the bleeders 130 and 132, are balanced with respect to ground.

The grid circuits of the switching tubes are also desirably balanced with respect to ground by means of grid return resistors 180 of equal value. The outputs H of register 20 flip-flops are connected, respectively, to the grids of the switching tubes 146, 148, 150, 152, 154 and 156 which are connected to successive taps of the bleeder 130. The other outputs L of the register 20 flip-flops are connected to the grids of the switching tubes 158, 160, 162, 164, 166 and 168. The switching tubes (for example, the tubes 148 and 160) which are plate connected to corresponding taps of the bleeders 130 and 132 have the H and L output of the same flip-flop (for example, the flip-flop 96) applied respectively to the grids thereof.

A pair of tubes 182 and 184 are plate connected to the ends of the bleeders 130 and 132, respectively, and cathode connected together through the resistor of a potentiometer 186, the top of potentiometer 186, a resistor 188, and another potentiometer resistor 190. The potentiometer circuit is used to adjust the initial balance of the currents transmitted through the bleeders 130 and 132 so that the voltages on the vertical deflection plates will normally be balanced with respect to ground. The potentiometer 174, the resistor of which is in series with the cathode circuits of the switching tubes and the source of negative operating voltage —B, may be used to adjust the initial position of the beam, by positioning its tap connected to one end of its resistor, as will be brought out more fully hereinafter.

When the flip-flops 94, 96, 98, 100, 102 and 104 (FIG. 5) are reset, as is the case before the code combination for the next character is read from the tape 10 by the tape reader 14 (FIG. 1), the L outputs of these flip-flops are all positive with respect to ground. The switching tubes 158, 160, 162, 164, 166 and 168 are driven into conduction by positive voltages from the flip-flop L outputs applied to their grids. Current then flows from the operating voltage source +B to the operating voltage source —B through all the sections of the bleeder 132, through all of the switching tubes which are connected thereto, the cathode resistors 170 and 172, the potentiometer 174, and resistor 176. A voltage proportional to thirty-two units of vertical deflection is applied to the upper vertical deflection plate in response to current which flows through the entire bleeder and through the switching tube 168. Current which flows through the bleeder sections 134, 136, 138, 140 and 142 and the switching tube 166 establishes a voltage proportional to 16 units of vertical deflection on the upper deflection plate. Similarly, the respective currents which flow through the bleeder sections 140, 138, 136 and 134 and their connected switching tubes 164, 162, 160 and 158 establish voltages proportional to 8, 4, 2 and 1 units of deflection. The sum of these deflection voltages which is established across the bleeder is proportional to 64 units of deflection. Thus, initially when the flip-flops of the code register 20 are reset, the deflection voltages which are negative with respect to ground are applied to the upper vertical deflection plate and deflect the beam downwardly to a position on the screen 42 corresponding to the bottom of the mask 28, or just below the first horizontal character track on the mask 28.

When a code for a particular character (for example, the letter "A") is stored in the register 20, the flip-flop 104 is set, since the code for the letter "A" is a single bit in the $2^5$ column. The switching tube 156 then is driven into conduction by a positive voltage applied from the H output of the flip-flop 104. The L output of this flip-flop goes negative, causing the switching tube 168, which corresponds to the switching tube 156, to cut off. Current then flows through all of the resistor sections of the bleeder 130 and through the switching tube 156, its cathode resistors 170 and 172, and the centering resistors 174 and 176 from the source of positive operating voltage +B to the source of negative operating voltage —B. Since the total resistance of the bleeder is proportional to 32 units of the deflection, a negative voltage proportional to 32 units of deflection is applied to the lower vertical deflection plate. The deflection voltage on the upper vertical deflection plate decreases by 32 units of deflection since the switching tube 168 is cut off. A voltage proportional to 16 units of deflection continues to be applied to the upper vertical deflection plates due to current flowing through the resistor sections 134, 136, 138, 140 and 142 of the lower bleeder 132 and their associated switching tubes 158, 160, 162, 164 and 166. The net deflection voltage, that is, the sum of the voltages applied to the lower and upper deflection plates, is proportional to the voltage across the bleeder 130 minus the voltage across the bleeder 132. Thus, the voltage across the vertical deflection plates is proportional to 32 units of deflection and tends to deflect the beam in the tube 24 upwardly to a position corresponding to the position of the character track for the letter "A," which is the 32nd vertical character track as noted in FIGS. 2 and 4.

The initial position of the beam below the first character track may be adjusted by means of the potentiometer 174 when the flip-flops in the code register 20 are reset. The balance of the deflection voltages established on the resistor sections of the bleeders 130 and 132 is adjustable by means of the potentiometer 172 and the centering potentiometer 186. The potentiometers 172 may also be used to adjust the deflection currents to the end that the proper deflection voltages may be developed in spite of slight variations among the resistances of the resistor sections in the bleeders 130 and 132.

The deflection circuits including the bleeders 130 and 132 and their associated switching tubes effectively convert the binary character code stored in the flip-flop of the code register 20 into anolog form, and represent the code by a voltage of a magnitude proportional to the decimal value of the code. Since the decimal value of the code is proportional to the vertical position of the character tracks on the slide 28, this analog voltage directly corresponds to the desired character track and facilitates the selection of a character track and the generation of a character signal in accordance with the digital code for the selected character.

*The horizontal sweep generator for character signal generation*

Once the character track is selected, the beam in the cathode ray tube may be deflected in a horizontal direction to develop a spot of light which sweeps across and traces the selected character track on the mask 28. The appropriate horizontal deflection voltages may be developed by the horizontal sweep generator 44 shown in detail in FIG. 7. The horizontal sweep is triggered by the character sync pulses developed in the timing circuits of the code register 20 (FIG. 5). These character sync pulses are applied to a monostable multivibrator 200 which provides a pulse equal in duration to the time allocated for writing a character on the thin-window cathode ray tube 52 (FIG. 1). As mentioned above, this time may be equal to the time required for the scanning of eleven vertical scanning lines on the face of the thin-window cathode ray tube 52. The pulse from the output of the multivibrator 200 is negative with respect to ground and has a leading edge which is delayed slightly (for example, by means of an R–C delay circuit in the trigger input to the monostable multivibrator 200) so that a character may be stored in the register 20 and the vertical deflection circuits may operate to develop deflection voltages which will deflect the beam to the position of the selected character track before the horizontal sweep is initiated.

Sweep voltages are generated by the discharge of a capacitor 202 through a discharge tube 204 and its cathode resistors 206, 208 and 210. The latter resistors desirably have a very high value of total resistance of the order of megohms so that the discharge voltage will be a linear sawtooth. The capacitor 202 is normally charged from a source of positive operating voltage +B through a normally conductive control tube 212. This tube 212 is cut off by the negative pulse from the monostable multivibrator 200. The capacitor then may discharge through the discharge tube 204 and its cathode resistors towards the voltage of the negative operating voltage source (e.g., —1400 volts D.C.). The sawtooth discharge voltage across the capacitor 202 is applied to a tube 214 which drives one of the horizontal deflection plates 36 of the cathode ray tube 24 (FIG. 1). The voltage applied to this horizontal deflection plate appears across a cathode resistor 216 of the tube 214. A portion of the voltage across the cathode resistor 216, obtained by means of a voltage divider including two resistors 218 and 220, is applied to a D.C. amplifier 222 which provides an output signal corresponding to the voltage across the resistor 216, but of opposite polarity. This output voltage is applied to a tube 224 which is similar to the tube 214 and is used to drive the other one of the pair of horizontal deflection plates 36 by means of voltages developed across its cathode resistor 226.

The voltage across the cathode resistor 226 is compared with the voltage across the cathode resistor 216 to insure that the deflection voltages are of equal magnitude but opposite polarity by means of an adding network including the resistor 218 and another resistor 228. If the deflection voltages are not equal, an error voltage for feeding back to the D.C. amplifier 222 is used to correct the voltage across the resistor 226 so as to tend to eliminate the error voltage.

At the termination of the output pulse from the monostable multivibrator 200, the control tube 212 is again made conductive so that the capacitor 202 can recharge rapidly through the low resistance path provided by the tube 212. In so recharging the beam retraces to a position at the beginning of the character tracks. The time used for the retrace of the beam is allotted to provide spacing between characters, which facilitates the reading of words formed by these characters.

*The vertical sweep generator*

The vertical sweep generator 56, which is used to deflect the beam in the thin-window tube 52 in synchronism with the horizontal tracing of the character tracks, is shown in FIG. 8. It is a feature of this vertical sweep generator 56 that the beginning of the first vertical scanning line for writing a character corresponds with the beginning of the horizontal tracing of the character track which generates character signals for writing that character.

The sweep circuit is effectively a synchronized, free running, sawtooth generator using a capacitor 230 which is discharged by means of a normally non-conductive discharge tube 232 to develop a sawtooth voltage. The discharge tube is normally biased to cut-off by a source of operating voltage −B through a resistor 234. A positive pulse applied from the output of a trigger circuit 236 through a coupling resistor-capacitor network 237 renders the discharge tube 232 conductive and permits the capacitor 230 to discharge. The voltage across the capacitor 230 is applied to the grid of a phase splitter tube 238. An output voltage of one polarity is obtained across the plate resistor 240 of the tube 238 and a voltage of opposite polarity is obtained across the cathode resistors 242 of that tube 238. Part of the voltage across the cathode resistors 242 is tapped and applied to the input of the trigger circuit 236.

As soon as the voltage across the capacitor 230 drops to a predetermined value, the trigger circuit will be triggered in an opposite direction so that the voltage from the trigger circuit which renders the discharge tube 232 conductive is removed and the tube 232 is cut off. The capacitor 230 may then be charged from the source of operating potential +B through a resistor 244 and a potentiometer 246 When the capacitor 230 charges to a predetermined voltage, the trigger circuit 236 is triggered by the voltage tapped from the cathode resistors 242 of the phase splitter tube 238, which voltage corresponds to the voltage across the capacitor 230. The discharge tube is then rendered conductive and the capacitor 230 discharged. The circuit operates cyclically to generate sawtooth voltages having a predetermined period set by the triggering potential of the circuit 236. This period is such that fourteen cycles occur during a horizontal sweep of the beam across the screen of the generator cathode ray tube 24; that is the duration of the sawtooth waves from the sweep generator is, by way of example, $\frac{1}{14}$ of the duration of the sawtooth waves from the horizontal sweep generator 44 in the herein described embodiment of the invention.

The character sync pulses synchronize the vertical sweep by triggering the trigger circuit. The sync pulses from the monostable multivibrator 88 (FIG. 5) are desirably inverted for this purpose (for example, by means of one of the stages of the monostable multivibrator 200 of FIG. 7). When a character sync pulse appears, the trigger circuit 236 provides a pulse to render the discharge tube 232 conductive so that the capacitor 230 begins to discharge upon occurrence of a character sync pulse. Thus, the vertical sweep of the beam in the thin-window tube 52 can begin simultaneously with the horizontal sweep of the beam in the character signal generating cathode ray tube 24. The sweep voltages may be obtained from the cathode and anode of the phase splitter tube 238 and applied through suitable coupling circuits 248 to a vertical amplifier 249 which drive the vertical deflection windings of the yoke of the thin-window cathode ray tube 56. Suitable centering currents may be applied to the yoke of the thin-window cathode ray tube by means of a divider including resistors 250.

From the foregoing description, it will be apparent that there has been provided improved apparatus for translating a code for a character into a character representing signal and, by means of that signal, into legible form. The system may be used as terminal equipment in communication apparatus as well as for data processing purposes. Other variations and modifications within the scope of the invention will undoubtedly suggest themselves to those skilled in the art. Accordingly, the foregoing description should be taken as illustrative and not in any limiting sense.

What is claimed is:

1. Information translation apparatus comprising output means for displaying successive adjacent portions of individual characters, a mask having a plurality of sequences of radiant energy transmissive and opaque portions corresponding to successive portions of different ones of said characters, said sequences being disposed respectively along different, spaced lines, means operative in response to coded information for said characters for providing inputs to said output means in response to radiant energy transmitted through successive adjacent portions of those of said lines having positions corresponding to said coded information, and means responsive to said coded information for generating a beam of radiant energy incident upon a selected one of said lines and scanning said beam across said selected line.

2. A system for translating a code representing a character into legible form comprising (a) means for providing a beam of radiant energy,
(b) means for indexing said beam of light at different positions along one of two rectangular coordinates,
(c) a mask adjacent said beam providing means having a plurality of tracks disposed along the other of said coordinates and spaced from each other at different positions corresponding to said indexing positions along said one coordinate,
(d) said tracks having patterns of radiant energy opaque and transmitting areas,
(e) means for scanning said beam in the direction of said other coordinate after said beam is indexed,
(f) means for translating the energy transmitted through said mask into electrical signals, and
(g) means for displaying adjacent portions of a character in succession controlled by said signals from said translating means for translating signals into legible form.

3. Information translation apparatus comprising output means for displaying successive, adjacent segments of a selected character, and input means for translating a coded information representing said character into a series of electrical signals corresponding respectively to said successive adjacent segments, said input means comprising a mask having a plurality of tracks parallel to a first coordinate, each of said tracks having groups of successive radiant energy transmissive and opaque portions corresponding respectively to successive, adjacent segments of different characters, and means for scanning a beam of radiant energy across one of said tracks corresponding to said selected character, said scanning means including means responsive to said coded information for deflecting said beam along a second coordinate transverse to said first coordinate to the one of said tracks which correspond to said selected character.

4. Information translation apparatus comprising (a) output means for displaying successive, adjacent portions of a selected character,
(b) a mask having a plurality of sequences of radiant energy transmissive and opaque portions corresponding to successive portions of different characters,
  (1) each of said plurality of different sequences being arranged along a different one of a plurality of parallel tracks,
  (2) said tracks being disposed in an area defined by Cartesian coordinates and along one of said coordinates,
(c) means for generating a beam of radiant energy incident upon said mask,
(d) means responsive to information according to a code for said selected character for deflecting said beam along the other of said Cartesian coordinates to a position on said mask adjacent the beginning of the tracks for said selected character,
(e) means for scanning said beam along said one coordinate, and
(f) means for translating radiant energy transmitted through said mask into electrical signal inputs for said output means.

5. Information translation apparatus comprising (a) output means for displaying successive, adjacent portions of individual characters, (b) a cathode ray tube having means for forming an electron beam and including a fluorescent screen on which said beam is adapted to be incident,
(c) a mask having a plurality of tracks, each including sequences of light transmissive and light opaque portions corresponding to successive, adjacent portions of their respective characters, said tracks being disposed parallel to each other and in the same direction,
(d) means for generating a light beam incident upon said mask,
(e) coded information operated means for deflecting said beam in a direction transverse to said tracks to be incident upon a selected one of said tracks in response to the coded information for a selected one of said characters,
(f) means for deflecting said beam in a direction along said selected track, after said beam is incident on the selected one of said tracks, and
(g) means responsive to light transmitted through said selected track for providing electrical input signals to said output means.

6. Information translation apparatus comprising
(a) output means for displaying successive, adjacent portions of individual selected characters,
(b) a cathode ray tube having means for forming an electron beam and including a fluorescent screen on which said beam is incident,
(c) a mask having a plurality of parallel tracks arranged along one of two Cartesian coordinates, each of said tracks corresponding to a different character and having a plurality of sequences of light transmissive and opaque portions corresponding to successive portions of its character, light emitted from said screen being incident on said mask,
(d) coded information responsive means operatively coupled to said tube for deflecting said beam along the other of said Cartesian coordinates for illuminating a spot on the one of said tracks corresponding to an individual one of said selected characters,
(e) means for deflecting said beam along said other Cartesian coordinate for tracing said spot across said one of said tracks, and
(f) photo-responsive means responsive to the light transmitted through the light transmissive portions of said one selected track for providing electrical signal inputs to said output means.

7. Apparatus for translating into legible form digital codes including a plurality of code bits different combinations of which represent different characters, said system comprising
(a) code register means for storing the individual bits of said code,
(b) a cathode ray tube including means for generating an electron beam and also including a fluorescent screen,
(c) means for deflecting said beam along a line on said screen extending in a first direction and indexing said beam at different positions on said line in response to different combinations of bits stored in said register, each of said positions corresponding to a different said code combination,
(d) means for deflecting said beam across said screen along a line in a second direction transverse to said first direction after said beam is indexed,
(e) a mask having a plurality of parallel tracks disposed along spaced lines in said second direction and spaced from each other in said first direction at positions corresponding to said index positions, said mask being disposed in the path of light emitted from said screen,
(f) photoelectric means for translating light from said screen transmitted through said mask into electrical signals, and
(g) means responsive to said signals for displaying said characters in legible form.

8. A system for translating codes representing characters into legible form comprising
(a) a cathode ray tube having
(1) means for generating an electron beam,
(2) first means for deflecting said beam in a first direction,
(3) second means for deflecting said beam in a second direction transverse to said one direction, and
(4) a fluorescent screen on which said beam is incident for emitting light in response to the incidence of said beam thereon,
(b) a sweep generator circuit coupled to one of said deflecting means for sweeping said beam across said screen in said one direction,
(c) code responsive means coupled to said second deflection means for indexing said beam at a plurality of different positions along a line on said screen in said second direction, each of said different positions corresponding to the code for different ones of said characters,
(d) a mask adjacent said screen in the path of light therefrom,
(1) said mask having a plurality of tracks corresponding to said characters and disposed along lines running in said first direction and spaced from each other in said second direction at positions corresponding to said index positions of said beam,
(2) said tracks each having light transparent and opaque sections corresponding to the dark and light areas of successive, adjacent sections of their respective characters,
(e) means responsive to light transmitted through selected ones of said tracks when light from said screen traces thereacross upon deflection of said beam in said first direction for providing electrical signals corresponding to selected ones of said characters,
(f) another cathode ray tube for displaying said selected characters and having
(1) means for generating an electron beam,
(2) a fluorescent screen, and
(3) means for deflecting said beam across said fluorescent screens,
(g) means for operating said last-named deflecting means to scan a raster on its said display tube fluorescent screen, adjacent sweeps of said raster corresponding to adjacent sections of said characters, and
(h) means for modulating said electron beam generated in said display cathode ray tube in response to said signals from said light responsive means whereby to trace said characters as said raster is scanned.

9. A system for translating codes representing characters into legible form comprising
(a) a cathode ray tube having
(1) means for generating an electron beam,
(2) first means for deflecting said beam in a first direction,
(3) second means for deflecting said beam in a second direction transverse to said one direction, and
(4) a fluorescent screen on which said beam is incident for emitting light in response to the incidence of said beam thereon,
(b) a sweep generator circuit coupled to one of said deflecting means for sweeping said beam across said screen in said one direction,
(c) code responsive means coupled to said second deflection means for indexing said beam at a plurality of different positions along a line on said screen in said second direction, each of said different positions corresponding to the code for different ones of said characters, (d) a mask adjacent said screen in the path of light therefrom, (1) said mask having a plurality of tracks corresponding to said characters and disposed along lines running in said first direction and spaced from each other in said second direction at positions corresponding to said index positions of said beam, (2) said tracks each having light transparent and opaque sections corresponding to the dark and light areas of successive adjacent sections of their respective characters, (e) means responsive to light transmitted through selected ones of said tracks when light from said screen traces thereacross upon deflection of said beam in said first direction for providing electrical signals corresponding to selected ones of said characters, (f) another cathode ray tube for displaying said selected characters and having (1) means for generating an electron beam, (2) a fluorescent screen, and (3) means for deflecting said beam across said fluorescent screens, (g) means for operating said last-named deflecting means to scan a raster on its said display tube fluorescent screen, adjacent sweeps of said raster corresponding to adjacent sections of said characters, (h) means for modulating said electron beam generated in said display cathode ray tube in response to said signals from said light responsive means whereby to trace said characters as said raster is scanned, and (i) synchronizing means for initiating the beginning of said raster simultaneously with the beginning of the deflection of said electron beam in said first direction in said first-mentioned cathode ray tube.

10. A system for translating a code representing a character into a series of electrical signals corresponding, respectively, to successive segments of said character, said system comprising (a) a mask having sequences of radiant energy transmissive and opaque portions corresponding to successive portions of said characters and disposed along a line, (b) means responsive to said code for generating a beam of radiant energy incident upon said line and scanning said beam across said line, and (c) means for translating radiant energy transmitted through said mask into said series of electrical signals.

References Cited by the Examiner

UNITED STATES PATENTS

| | | | |
|---|---|---|---|
| 2,762,862 | 9/1956 | Bliss | 340—324.1 |
| 2,767,908 | 10/1956 | Thomas | 340—324.1 |
| 2,807,663 | 9/1957 | Young | 340—324.1 |
| 2,906,819 | 9/1959 | Smith | 340—324.1 |
| 2,939,632 | 6/1960 | Demer | 340—324.1 |
| 2,987,715 | 6/1961 | Jones et al. | 340—324.1 |
| 2,992,293 | 7/1961 | Cameron et al. | 178—6.8 |

NEIL C. READ, *Primary Examiner*.